(12) United States Patent
Mase (10) Patent No.: US 7,224,799 B2
(45) Date of Patent: May 29, 2007

(54) DIGITAL WATERMARKING DEVICE, DIGITAL WATERMARK INSERTION METHOD AND DIGITAL WATERMARK DETECTION METHOD

(75) Inventor: Katsuyoshi Mase, Tokyo (JP)

(73) Assignee: NEC Corporation, Tokyo (JP)

( * ) Notice: Subject to any disclaimer, the term of this patent is extended or adjusted under 35 U.S.C. 154(b) by 1059 days.

(21) Appl. No.: 09/865,271

(22) Filed: May 25, 2001

(65) Prior Publication Data

US 2001/0047478 A1 Nov. 29, 2001

(30) Foreign Application Priority Data

May 26, 2000 (JP) ............................ 2000/157205

(51) Int. Cl.
H04N 1/40 (2006.01)
H04N 7/167 (2006.01)
H04L 9/00 (2006.01)

(52) U.S. Cl. ...................... 380/241; 358/3.28; 713/176

(58) Field of Classification Search ................ 713/176, 713/200, 201; 380/200, 241, 54; 358/3.28, 358/1.9
See application file for complete search history.

(56) References Cited

U.S. PATENT DOCUMENTS

| 5,889,868 A * | 3/1999 | Moskowitz et al. ........ 713/176 |
| 5,949,885 A * | 9/1999 | Leighton ..................... 380/54 |
| 6,628,719 B1 * | 9/2003 | Kono et al. ............ 375/240.28 |
| 2001/0054150 A1 * | 12/2001 | Levy .......................... 713/176 |

FOREIGN PATENT DOCUMENTS

JP 2000-59610 2/2000
JP 2000-59730 2/2000

OTHER PUBLICATIONS

Rakhi Motwani, "Watermarking Introduction", Mar. 1, 2001, [Retrieved from Internet Nov. 10, 2004], "http://www.cs.urn.edu/~rekhi/reportwm.html".*
Rommel P. Feria's posting on Monday, May 24, 1999 12:00 am on rec.photo.digital discussion group.*
Satellite interference detection using real-time watermarking technique for SMS Chuen-Ching Wang; Yih-Chuan Lin; Shu-Chung Ti; Information Technology and Applications, 2005. ICITA 2005. Third International Conference on vol. 2, Jul. 4-7, 2005 pp. 238-241 vol. 2.*
A New Watermarking Protocol of Copyright Protection Ru Zhang; Xiao-gang Yu; Lin-na Zhou; Hong-peng Li; Intelligent Information Hiding and Multimedia Signal Processing, 2006. IIH-MSP '06. International Conference on Dec. 2006 pp. 83-86.*
Distributed Garbage Collection Algorithms for Timestamped Data Ramachandran, U.; Knobe, K.; Harel, N.; Mandviwala, H.A.; Parallel and Distributed Systems, IEEE Transactions on vol. 17, Issue 10, Oct. 2006 pp. 1057-1071.*

* cited by examiner

Primary Examiner—David Jung
(74) Attorney, Agent, or Firm—Scully, Scott, Murphy & Presser, P.C.

(57) ABSTRACT

When inserting several types of digital watermark information into the digital information, the visual time stamp detection circuit extracts the time stamps corresponding to the visual data in the visual data stream and the digital watermark insertion circuit specifies the types of the digital watermark information to be inserted corresponding to the extracted time stamps and inserts the digital watermark information of the applicable types into the visual data so that such information is synthesized with the audio data by the mixer circuit.

34 Claims, 6 Drawing Sheets

DIGITAL WATERMARKING DEVICE, DIGITAL WATERMARK INSERTION METHOD AND DIGITAL WATERMARK DETECTION METHOD

BACKGROUNDS OF THE INVENTION

1. Field of the Invention

The present invention relates to a digital watermarking device, a digital watermark insertion method and a digital watermark detection method.

2. Description of the Related Art

Digital information can be easily reproduced, and is often copied illegally. Various digital watermarking technologies to insert digital watermark information into the digital information have been proposed so that the copyright holder can claim his/her copyright to the person who copied the information illegally. Devices and methods for digital watermark insertion into the digital information include, for example, the devices and the methods described in the Japanese Patent Application Laid-open (Kokai) No. 2000-59610 and No. 2000-59730.

Figure 5:
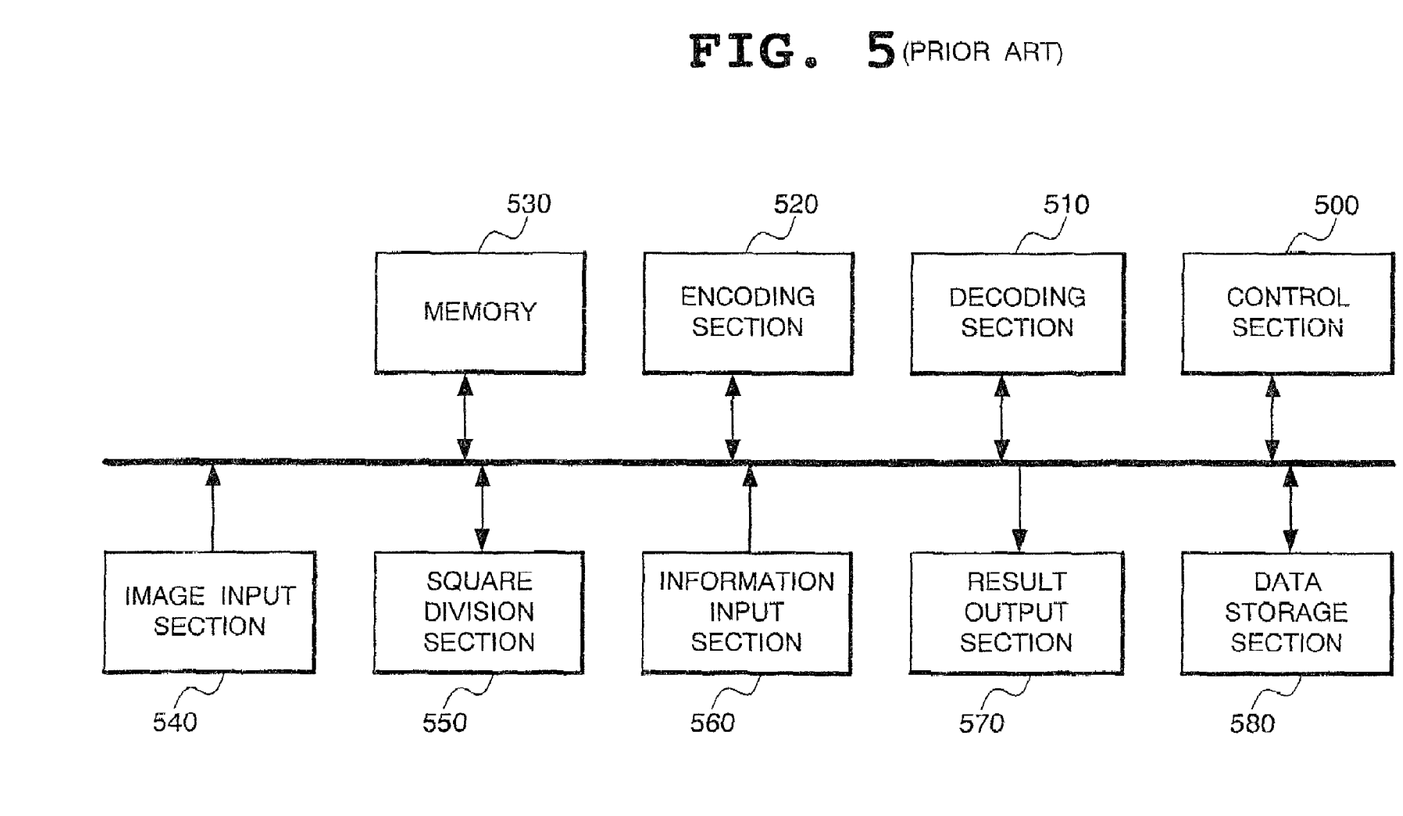
FIG. 5 is a block diagram to show an example of the configuration of a conventional digital watermarking device.

FIG. 5 is a block diagram showing an configuration example of the device described in the Japanese Patent Application Laid-open (Kokai) No. 2000-59610. In this device, an image input section 540 fetches the image data as the original image. A square division section 550 divides the original image into squares. An information input section 560 inputs the predetermined information to be embedded in the image data and an encoding section 520 embeds such information as the digital watermark information in the image data. Here, the encoding section 520 embeds the digital watermark information to every square (every block) divided. A control section 500 makes various controls. According to the device shown in FIG. 5, the digital watermark information is embedded to every piece of divided squares after division of the image data into squares, and the digital watermark information can be detected even when a part of the image data is cut off.

Figure 6:
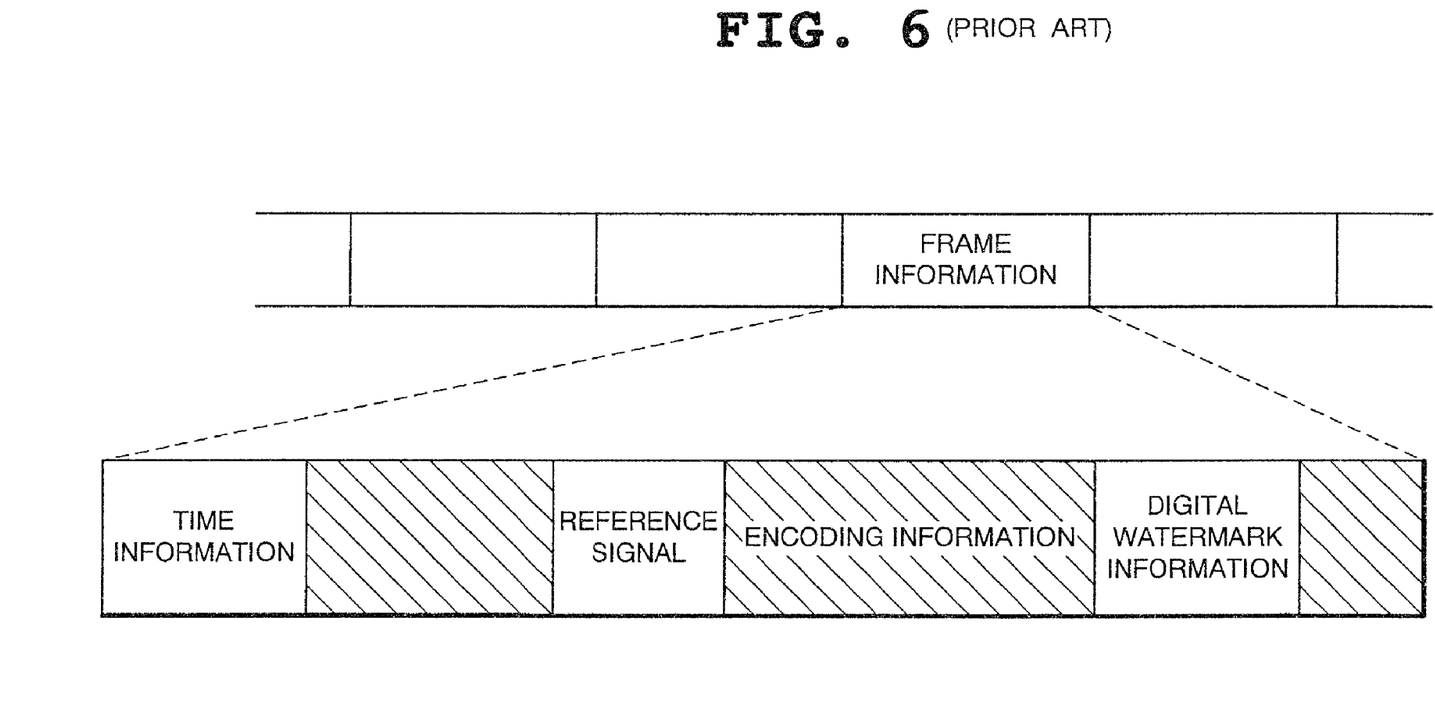
FIG. 6 is an explanatory view to illustrate the stream of data to which the digital watermark information is inserted according to the conventional method.

FIG. 6 shows an image stream to record the digital watermark information by the digital watermark information recording method as described in the Japanese Patent Application Laid-open (Kokai) No. 2000-59730. According to this recording method, the reference information to detect the digital watermark information is recorded in every frame containing the time information in the image stream. Here, the reference information is recorded so that it is contained in the encoded information obtained by encoding of the image. The position to record the reference information is uniquely specified by the time information. By this method, the reference information recording position varies frame by frame and the digital watermark information can be taken out by detecting the reference signal even when a part of the image information is masked.

Digital watermark information to be inserted into the image data includes, for example, the information about the owner of the image data and the information about whether or not to permit reproduction of the image data. When many types of digital watermark information are inserted to the image data, it will be difficult for a third party without authority for data utilization to analyze the digital watermark information. Therefore, to prevent analysis by a third party, it is preferable to insert as many types of information as possible for the digital watermark information.

Some types of inserted digital watermark information may deteriorate the image data. By inserting several types of digital watermark information, deterioration extent of the image data by a certain type of digital watermark information can be reduced. From this viewpoint, too, it is preferable to insert several types of information as the digital watermark information.

It is also preferable that the number of types of the digital watermark information to be inserted is highly flexible. Note that, however, the scale of the device for insertion and detection of the digital watermark is preferably small.

According to the device as described in the Japanese Patent Application Laid-open No. 2000-59610, an image is divided into sections and digital watermark information is assigned to each section so that increased types of digital watermark information are inserted. However, because the digital watermark is embedded into the divided images, sufficient amount of digital watermark information cannot be embedded when the original image is not large enough over a certain size. In addition, when a divided section is lacking, the digital watermark information embedded to that section may not be obtained properly. The digital watermark information recording method as described in the Japanese Patent Application Laid-open No. 2000-59730 enables the digital watermark information to be taken out even when a part of the image information is masked, but it does not disclose a method to increase the types of digital watermark information to be recorded.

SUMMARY OF THE INVENTION

It is an object of the present invention to provide a digital watermarking device which inserts several types of digital watermark information into the digital information and detects the digital watermark information from the digital information with several types of digital watermark information inserted as well as to provide a digital watermark insertion method and a digital watermark detection method.

According to the first aspect of the invention, a digital watermarking device to insert the digital watermark information into the digital information comprises a digital watermark insertion circuit which inserts, to the digital information, the digital watermark information of the type uniquely specified corresponding to the data held by the digital information.

According to the digital watermarking device as described above, the digital watermark information is determined with utilizing the time stamp originally held by the digital information and the scale of the device can be kept small.

In the preferred construction, the digital watermark insertion circuit inserts the digital watermark information of the type uniquely specified corresponding to the time stamp information extracted from the visual data in the digital information into the visual data corresponding to the time stamps.

In another preferred construction, the digital watermarking device further comprises a data separation circuit which separates the digital information into the visual data and the audio data, and a data synthesis circuit which synthesizes the visual data and the audio data, wherein the digital watermark insertion circuit inserts the digital watermark information to the visual data separated by the data separation circuit, and the data synthesis circuit synthesizes the visual data containing the inserted digital watermark information and the audio data separated by the data separation circuit.

According to the digital watermarking device as described above, several types of digital watermark information can be inserted to the digital information containing the visual data and audio data.

In another preferred construction, the digital watermarking device further comprises a time stamp detection circuit which detects and extracts the time stamp information from the visual data in the digital information.

In another preferred construction, the digital watermarking device further comprises a data separation circuit which separates the digital information into the visual data and the audio data, a time stamp detection circuit which detects and extracts the time stamp information from the visual data, and a data synthesis circuit which synthesizes the visual data and the audio data, wherein the digital watermark insertion circuit inserts the digital watermark information of the type uniquely specified corresponding to the time stamp information extracted from the visual data into the visual data separated by the data separation circuit, and the data synthesis circuit synthesizes the visual data containing the inserted digital watermark information and the audio data separated by the data separation circuit.

According to the second aspect of the invention, a digital watermarking device to detect the digital watermark information from the digital information comprises a digital watermark detection circuit which detects, from the digital information, the digital watermark information of the type uniquely specified corresponding to the data held by the digital information.

According to the digital watermarking device as described above, the digital watermark information can be checked while the visual and audio data in the digital information are played.

In the preferred construction, the digital watermark detection circuit detects the digital watermark information of the type uniquely specified corresponding to the time stamp information extracted from the visual data in the digital information from the visual data corresponding to the time stamps.

In another preferred construction, the digital watermarking device further comprises a data separation circuit which separates the digital information into the visual data and the audio data, a display signal generation circuit which prepares the display signal by synthesizing the visual data with the digital watermark information detected by the digital watermark detection circuit, and an audio data conversion circuit which converts the audio data separated by the data separation circuit into the analog signal, wherein the digital watermark detection circuit detects the digital watermark information from the visual data separated by the data separation circuit.

In another preferred construction, the digital watermarking device further comprises a time stamp detection circuit which detects and extracts the time stamp information from the visual data in the digital information.

In another preferred construction, the digital watermarking device further comprises a data separation circuit which separates the digital information into the visual data and the audio data, a time stamp detection circuit which detects and extracts the time stamp information from the visual data in the digital information, a display signal generation circuit which prepares the display signal by synthesizing the visual data with the digital watermark information detected by the digital watermark detection circuit, and an audio data conversion circuit which converts the audio data separated by the data separation circuit into the analog signal, wherein the digital watermark detection circuit detects the digital watermark information of the type uniquely corresponding to the time stamp information extracted from the visual data in the digital information from the visual data separated by the data separation circuit corresponding to the time stamps.

According to the third aspect of the invention, a digital watermarking device to insert the digital watermark information into the digital information comprises a digital watermark insertion circuit which inserts the digital watermark information of the type uniquely specified corresponding to the data held by the digital information to the digital information, and a digital watermark detection circuit which detects the digital watermark information of the type uniquely specified corresponding to the data held by the digital information from the digital information.

In the preferred construction, the digital watermark insertion circuit inserts the digital watermark information of the type uniquely specified corresponding to the time stamp information extracted from the visual data in the digital information to the visual data corresponding to the time stamps, and the digital watermark detection circuit detects the digital watermark information of the type uniquely specified corresponding to the time stamp information extracted from the visual data in the digital information from the visual data corresponding to the time stamps.

In another preferred construction, the digital watermarking device further comprises a data separation circuit which separates the digital information into the visual data and the audio data, a time stamp detection circuit which detects and extracts the time stamp information from the visual data, a data synthesis circuit which synthesizes the visual data and the audio data, a display signal generation circuit which prepares the display signal by synthesizing the visual data with the digital watermark information detected by the digital watermark detection circuit, and an audio data conversion circuit which converts the audio data separated by the data separation circuit into the analog signal, wherein the digital watermark insertion circuit inserts, to the visual data separated by the data separation circuit, the digital watermark information of the type uniquely specified corresponding to the time stamp information extracted from the visual data, the data synthesis circuit synthesizes the visual data containing the inserted digital watermark information and the audio data separated by the data separation circuit, and the digital watermark detection circuit detects, from the visual data separated by the data separation circuit corresponding to the time stamps, the digital watermark information of the type uniquely specified corresponding to the time stamp information extracted from the visual data in the digital information.

According to another aspect of the invention, a digital watermark insertion method to insert the digital watermark information into the digital information, wherein inserting the digital watermark information of the type uniquely specified corresponding to the data held by the digital information to the digital information.

In the preferred construction, the digital watermark insertion method, wherein extracting the time stamp information corresponding to the visual data in the digital information when the digital watermark information of the type uniquely specified corresponding to the data held by the digital information is inserted to the digital information, and inserting the digital watermark information of the type uniquely specified corresponding to the time stamp information to the visual data corresponding to the time stamps.

According to another aspect of the invention, a digital watermark detection method to detect the digital watermark information from the digital information, wherein detecting the digital watermark information of the type uniquely specified corresponding to the data held by the digital information from the digital information.

In the preferred construction, when the digital watermark information of the type uniquely specified corresponding to the data held by the digital information is detected from the digital information, extracting the time stamp information corresponding to the visual data in the digital information and detecting the digital watermark information of the type uniquely specified corresponding to the time stamp information from the visual data corresponding to the time stamps.

According to a further aspect of the invention, a computer readable memory to store the digital watermark insertion program which executes the digital watermark insertion processing to insert the digital watermark information to the digital information by controlling the computer, wherein the digital watermark insertion program comprising the functions of executing the processing to insert, to the digital information, the digital watermark information of the type uniquely specified corresponding to the data held by the digital information.

According to a still further aspect of the invention, a computer readable memory to store the digital watermark detection program which executes the digital watermark detection processing to detect the digital watermark information from the digital information by controlling the computer, wherein the digital watermark detection program comprising the functions of executing the processing to detect, from the digital information, the digital watermark information of the type uniquely specified corresponding to the data held by the digital information.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
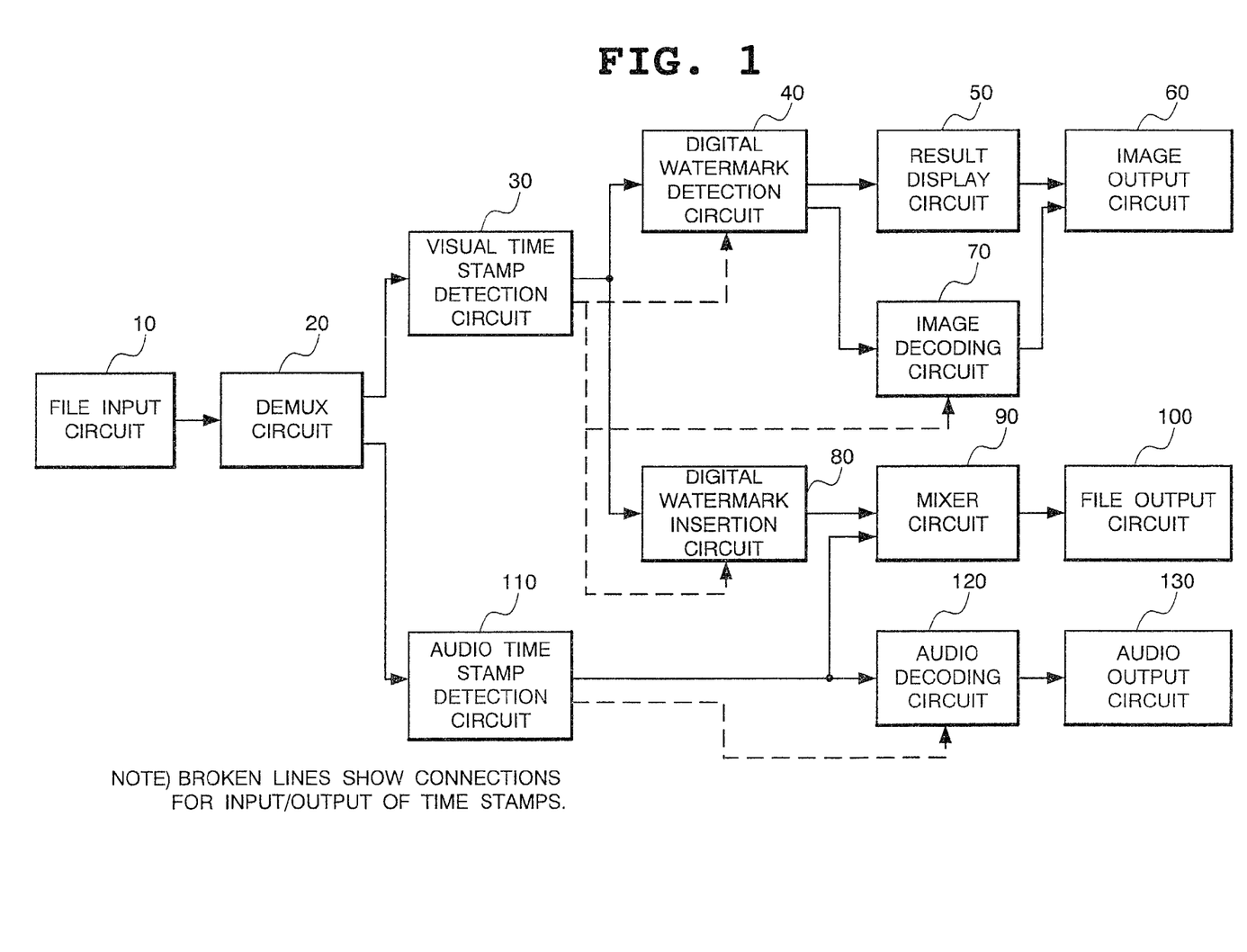
FIG. 1 is a block diagram to show an embodiment of a digital watermarking device according to the present invention.
Figure 2:
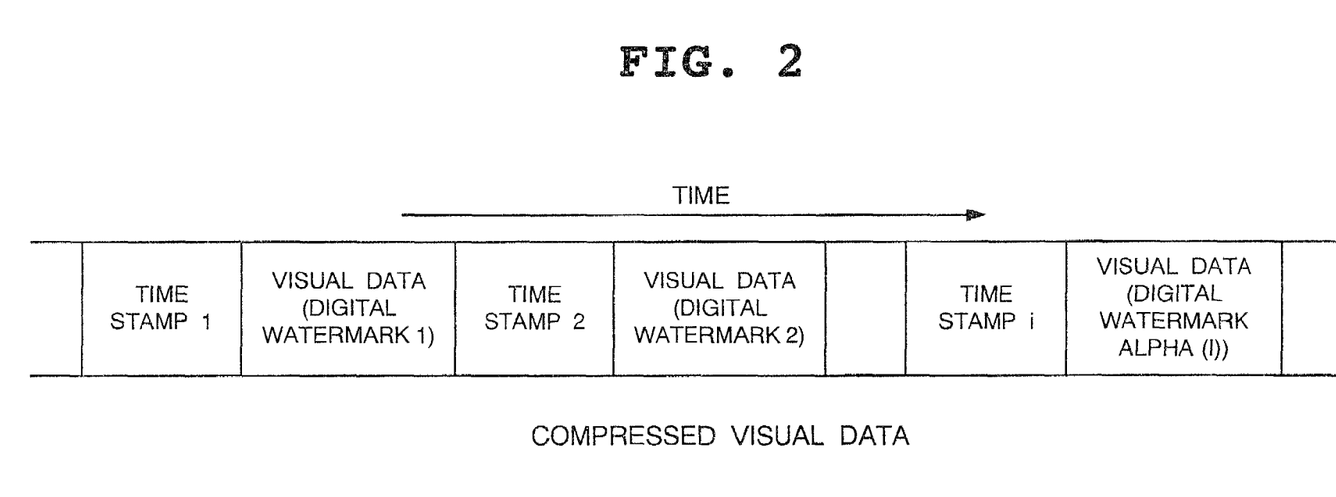
FIG. 2 is an explanatory view to illustrate an example of visual data stream.

FIG. 1 is a block diagram showing an embodiment of a digital watermarking device according to the present invention. A file input circuit 10 inputs the visual/audio data file containing the synthesized visual and audio data. Here, the file input circuit 10 inputs the compressed visual/audio data file. A Demux circuit 20 separates the input visual/audio data into the visual data and the audio data. FIG. 2 shows an example of the stream in the separated visual data. The visual data stream contains frames which consist of time stamps and compressed visual data. The separated audio data also has a similar stream.

A visual time stamp detection circuit 30 extracts the time stamps from the visual data. For detection of the digital watermark information, the visual time stamp detection circuit 30 outputs the time stamps and the visual data to a digital watermark detection circuit 40 and outputs the time stamps to an image decoding circuit 70. For insertion of the digital watermark information, the time stamps and the visual data are output to a digital watermark insertion circuit 80. The arrows shown in broken lines in the figure show the connections for input and output of the time stamps.

The digital watermark detection circuit 40 specifies the type of the digital watermark information to be detected corresponding to the time stamps and detects the specified digital watermark information from the input visual data. The digital watermark detection circuit 40 outputs the detected digital watermark information to a result display circuit 50 and outputs the visual data to the image decoding circuit 70.

Based on the digital watermark information input from the digital watermark detection circuit 40, the result display circuit 50 prepares the display data for the information and outputs the display data for the digital watermark information to an image output circuit 60. The image decoding circuit 70 receives the compressed visual data from the digital watermark detection circuit 40 and restores such data, and outputs the visual data to the image output circuit 60 according to the times given by the time stamps input from the visual time stamp detection circuit 30.

The image output circuit 60 synthesizes the display data input from the result display circuit 50 and the visual data input from the image decoding circuit 70 and prepares the display signal.

The digital watermark insertion circuit 80 specifies the type of the digital watermark information to be inserted according to the time stamps, and inserts the specified digital watermark information to the input visual data. The digital watermark insertion circuit 80 outputs the visual data with the digital watermark information inserted to a mixer circuit 90.

The mixer circuit 90 synthesizes the audio data input from an audio time stamp detection circuit 110 to be described later and the visual data input from the digital watermark insertion circuit 80. The file output circuit 100 stores the visual/audio data file synthesized by the mixer circuit 9.

The audio time stamp detection circuit 110 extracts the time stamps from the audio data and, when detecting the digital watermark information, outputs the time stamps and the audio data to an audio decoding circuit 120 and, when inserting the digital watermark information, outputs the audio data to the mixer circuit 90. The audio decoding circuit 120 restores the compressed audio data and outputs the data to an audio output circuit 130 according to the times indicated by the time stamps. The audio output circuit 130 converts the audio data restored by the audio decoding circuit 120 into the analog signal.

Next, the operation of the digital watermarking device having the above configuration will be described below.

Firstly, the operation when the visual/audio data without any digital watermark information inserted is input to the digital watermarking device, which inserts the digital watermark information to the data.

The visual/audio data without any digital watermark information inserted is input to the file input circuit 10, which outputs the data to the Demux circuit 20. Note that this data is compressed. The Demux circuit 20 separates the visual/audio data into the visual data and the audio data. Here, in the visual data stream as shown in FIG. 2, the visual data in each frame does not contain the digital watermark information. The Demux circuit 20 outputs the separated visual data and the audio data to the visual time stamp detection circuit 30 and the audio time stamp detection circuit 110 respectively.

The visual time stamp detection circuit 30 extracts the time stamp information from the visual data and outputs it to the digital watermark insertion circuit 80. In addition, the visual time stamp detection circuit 30 outputs the input visual data as it is to the digital watermark insertion circuit 80.

The digital watermark insertion circuit 80 uniquely specifies the type of the digital watermark information to be inserted corresponding to the input time stamp and inserts the digital watermark information of the applicable type to the visual data. For example, if the "Information about the owner of the visual/audio data file" is specified as the type of information to be inserted corresponding to a time stamp, the "Owner identification No." or the like will be inserted into the visual data corresponding to that time stamp. If the "Information about whether or not to permit reproduction of the visual/audio data file" is specified for a time stamp, the information "Reproducible" or "Not reproducible" or the like will be inserted.

The digital watermark insertion circuit 80 executes calculation using the time stamps and specifies the type of the digital watermark information according to the calculation results. For example, corresponding to the time stamp i, the digital watermark information circuit 80 calculates alpha (i) as the remainder of the formula (A*i+B)/C and specifies the type of the digital watermark information corresponding to alpha (i). Here, the digital watermark insertion circuit 80 associates the values of alpha (i) and the types of the digital watermark information in advance and specifies the type corresponding to alpha (i) as follows: "Information about the owner" for alpha (i)=1 and "Information whether or not to permit reproduction" for alpha (i)=2, for example. In this example, the value alpha (i) is determined as the remainder of the division using C, the digital watermark information of C types can be specified by change of the time stamp i. The calculation of alpha (i) here is just an example and other calculation methods may be used.

In addition, the digital watermark insertion circuit 80 stores the information to be inserted as various digital watermark information ("Owner ID No.", "Reproducible", "Not reproducible" and so on) in advance and inserts the information into the visual data corresponding to the specified type.

The digital watermark insertion circuit 80 outputs the visual data with the digital watermark information inserted to the mixer circuit 90.

Further, the audio time stamp detection circuit 110 outputs the audio data input from the Demux circuit 20 as it is to the mixer circuit 90.

The mixer circuit 90 synthesizes the visual data with the digital watermark information inserted and the audio data and outputs the synthesized data to the file output circuit 100. The file output circuit 100 stores the data synthesized by the mixer circuit 90 as the visual/audio data file.

By thus inserting the digital watermark information, various types of digital watermark information corresponding to the time stamp i are inserted to the visual data in the stream. With several types of digital watermark information inserted, analysis of the digital watermark information by a third party can be prevented. In addition, even when a particular type of digital watermark information deteriorates the image data, insertion of several types of digital watermark information can reduce the extent of such deterioration.

Next, the operation when the visual/audio data with the digital watermark information inserted is input to the digital watermarking device, which detects the digital watermark information from such data will be described below.

The file input circuit 10 receives the input of the visual/audio data with the digital watermark information inserted and then outputs such data to the Demux circuit 20. Note that this data is compressed. The Demux circuit. 20 separates the visual/audio data into the visual data and the audio data. Here, in the visual data stream as shown in FIG. 2, the visual data in each frame contains the digital watermark information. The Demux circuit 20 outputs the separated visual data and the audio data to the visual time stamp detection circuit 30 and the audio time stamp detection circuit 110 respectively.

The visual time stamp detection circuit 30 extracts the time stamp information from the visual data and outputs it to the digital watermark detection circuit 40 and the image decoding circuit 70. In addition, the visual time stamp detection circuit 30 outputs the input visual data as it is to the digital watermark detection circuit 40.

The digital watermark detection circuit 40 specifies the type of the digital watermark information to be detected corresponding to the input time stamp and detects the digital watermark information of the applicable type from the visual data. For example, if the "Information about the owner of the visual/audio data file" is specified as the type of information to be detected, "Owner identification No." or the like will be detected from the visual data corresponding to the time stamp. If the "Information about whether or not to permit reproduction of the visual/audio data file" is specified for the time stamp, the information "Reproducible" or "Not reproducible" will be detected.

The digital watermark detection circuit 40 executes calculation similar to that executed in specification of the digital watermark information by the digital watermark insertion circuit 80, and thereby identifies the type of the information from the time stamp. Thus, if the digital watermark insertion circuit 80 inserts the "Information about the owner" into the visual data corresponding to a certain time stamp, the digital watermark detection circuit 40 will detect the "Information about the owner" from the visual data.

The digital watermark detection circuit 40 outputs the detection result of the digital watermark information (information types and the applicable information) to the result display circuit 50. For example, if the "Owner identification No." is detected as the "Information about the owner", the type "Information about the owner" and the detected identification No. will be output to the result display circuit 5. The result display circuit 50 converts the digital watermark information type and the information itself input from the digital watermark detection circuit 40 into display data to be displayed as characters and images and outputs such data to the image output circuit 60.

The digital watermark detection circuit 40 outputs the visual data to the image decoding circuit 70. The image decoding circuit 70 restores the compressed visual data input from the digital watermark detection circuit 40. Then, corresponding to the times given by the time stamps input from the time stamp detection circuit 30, the restored visual data is output to the image output circuit 60. The image output circuit 60 synthesizes such visual data and the digital watermark information display data input from the result display circuit 50 and prepares the display signal. The display unit (not shown in the figures) uses such display signal to display the visual data and the digital watermark information.

The audio time stamp detection circuit 110 extracts the time stamp information from the audio data input from the Demux circuit 20 and outputs such information to the audio decoding circuit 120. The input audio data is also output to the audio decoding circuit 120. The audio decoding circuit 120 restores the compressed audio data input from the audio time stamp detection circuit 110. Then, corresponding to the times given by the time stamps, the restored audio data is output to the audio output circuit 130. The audio output circuit 130 converts the input audio data into the analog signal. The speaker or the like (not shown in the figures) uses the audio signal after conversion to reproduce the audio data.

By detecting the digital watermark information as described above, several types of digital watermark information inserted to the visual data corresponding to the time stamps can be detected.

Since the digital watermarking device as shown in FIG. 1 uses the time stamps originally held by the visual/audio data to specify the types of the information to be inserted or detected, the scale of the device can be kept small. By changing the calculation method of alpha (i) to associate the time stamps and the types of the digital watermark information, the number of digital watermark information types to be inserted or detected can be increased.

In the above embodiment, when the digital watermarking device inserts the digital watermark information into the visual/audio data without any digital watermark information inserted, the display signal may be prepared by the digital watermark detection circuit 40, the image decoding circuit 70 and the image output device 60. Further, the restored audio data may be converted into the analog signal by the audio decoding circuit 120 and the audio output circuit 130. With the display signal prepared and the audio data converted into the analog signal, visual/audio output from the display unit and the speaker or the like can be achieved at the same time as the insertion of the digital watermark information.

Though the "Information about the owner of the visual/audio data file" and the "Information about whether or not to permit reproduction of the visual/audio data file" are shown as examples of the digital watermark information types in the above embodiment, the types of the digital watermark information are not limited to them.

Next, a digital watermarking device according to another embodiment of the present invention will be described below.

Figure 3:
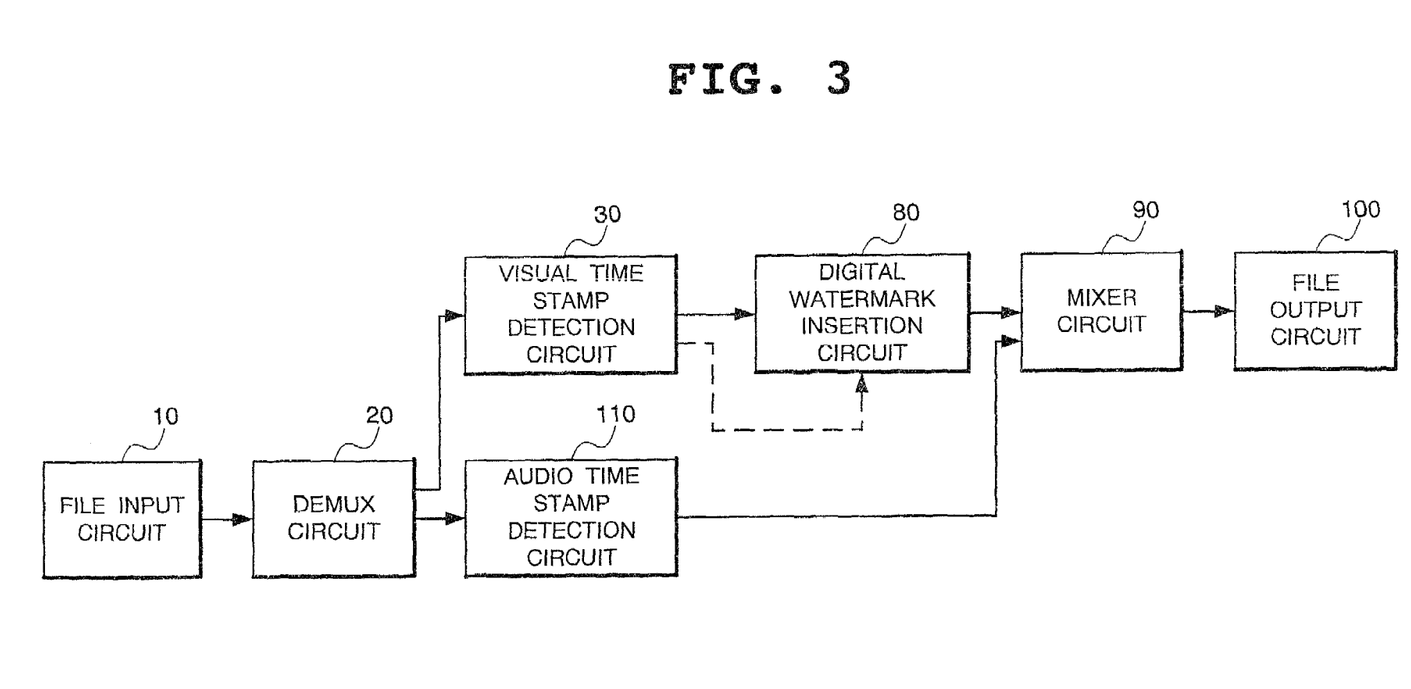
FIG. 3 is a block diagram to show another embodiment of the present invention.
Figure 4:
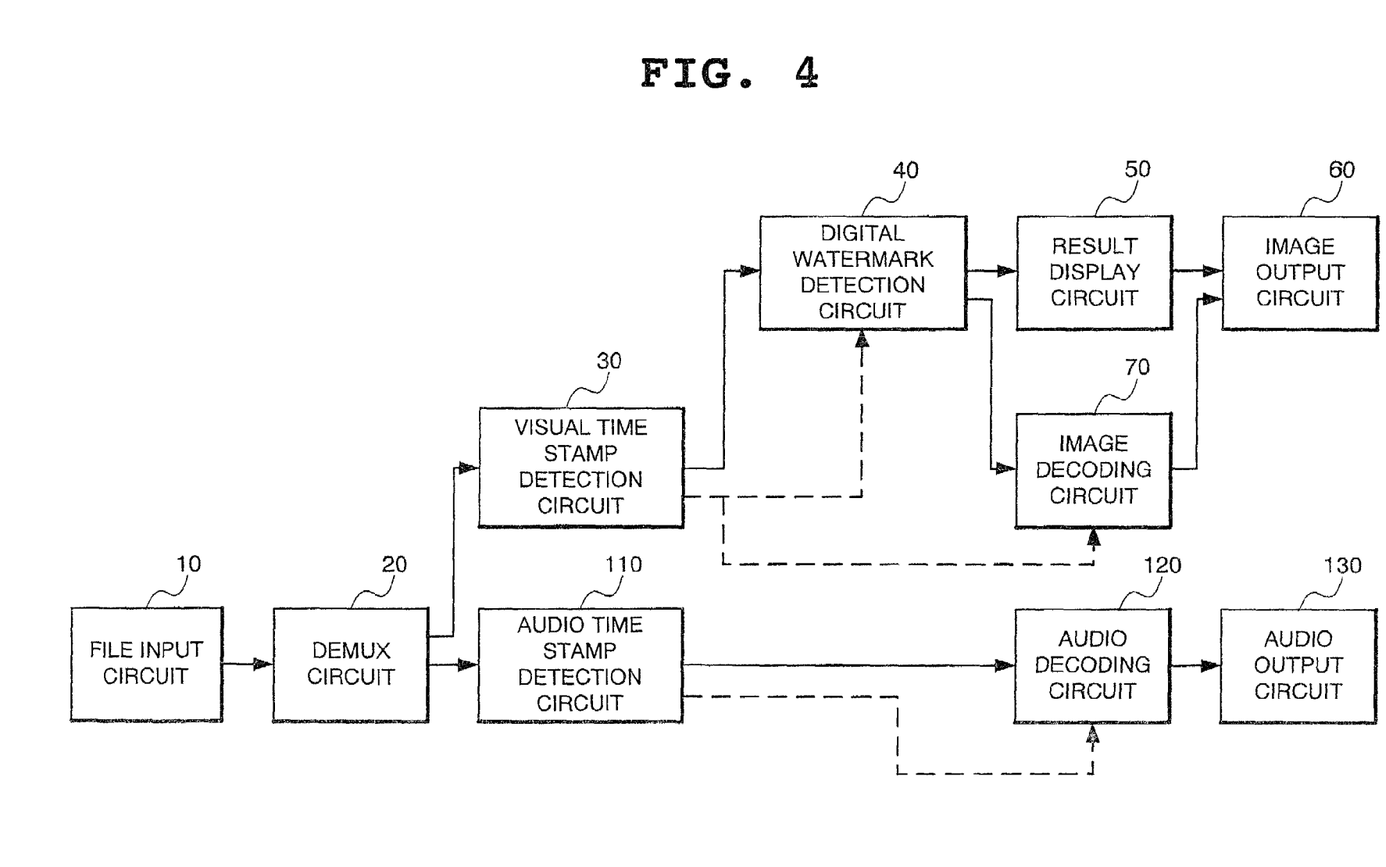
FIG. 4 is a block diagram to show still another embodiment of the present invention.

FIGS. 3 and 4 show block diagrams showing other embodiments of the present invention. The digital watermarking device as shown in FIG. 3 is a device to insert the digital watermark information into the visual/audio data without any digital watermark information inserted. However, it does not detect any digital watermark information from the visual/audio data with the digital watermark information inserted. The circuits of the digital watermarking device as shown in FIG. 3 are similar to the corresponding circuits shown in FIG. 1. Therefore, the operation to insert the digital watermark information to the visual/audio data is the same as that by the digital watermarking device according to the first embodiment above shown in FIG. 1. Note that, however, the digital watermarking device in this embodiment is not provided with an image decoding circuit 70, an audio decoding circuit 120 and so on and does not output visual/audio data from the display unit and the speaker or the like with inserting the digital watermark information.

The digital watermarking device as shown in FIG. 4 detects the digital watermark information from the visual/audio data with the digital watermark information inserted. Note that, however, it does not insert any digital watermark information to the visual/audio data without any digital watermark information inserted. The circuits of the digital watermarking device as shown in FIG. 4 are similar to the corresponding circuits in the first embodiment as shown in FIG. 1. Therefore, the operation to detect the digital watermark information from the visual/audio data is the same as that by the digital watermarking device according to the first embodiment shown in FIG. 1.

The digital watermarking device shown in FIG. 4 detects the digital watermarking information inserted by the digital watermarking device as shown in FIG. 3. However, the digital watermark insertion circuit 80 and the digital watermark detection circuit 40 need to make the same calculation when they specify the type of the information corresponding to the time stamps.

The digital watermark insertion method and the digital watermark detection method in the digital watermarking device according to the present invention can be realized by achieving the functions of the digital watermarking device with hardware, of course, and also by loading a computer program having the applicable functions (digital watermark insertion program) to the memory of the computer processor. The digital watermark insertion program can be stored in a magnetic disk, semiconductor memory or other recording medium (reference No.). Such program is loaded to the computer processor from the recording medium and controls the operation of the computer processor to achieve the functions as described above.

According to the digital watermarking device and the digital watermark insertion method of the present invention, the digital watermark information of the type uniquely specified corresponding to the data held by the digital information into the digital information. Thus, several types of digital watermark information can be inserted corresponding to the data in the digital information and thereby analysis of the digital watermark information by a third party can be prevented. Further, the image deterioration which may be caused by a particular type of digital watermark information can be reduced.

Further, according to the digital watermarking device and the digital watermark detection method of the present invention, the digital watermark information of the types uniquely specified according to the data held by the digital information is detected from the digital information. Thus, several types of the digital watermark information inserted can be detected.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A digital watermarking device for inserting digital watermarks into digital information, the digital watermarking device comprising:
    a digital watermark insertion circuit for inserting a plurality of digital watermarks into the digital information, each digital watermark being uniquely selected from a plurality of information types, said information types being selected based on a predefined data contained in said digital information at an insertion location of each watermark.

2. A digital watermarking device as set forth in claim 1, wherein said predefined data corresponds to time stamps extracted from visual data in the digital information and where said digital watermark insertion circuit inserts said digital watermark into the visual data at a locations corresponding to the time stamps.

3. A digital watermarking device as set forth in claim 2, further comprising:
    a data separation circuit for separating the digital information into visual data and audio data, said digital watermark insertion circuit inserting said digital watermark into said visual data separated by said data separation circuit; and
    a data synthesis circuit for combining the visual data and the audio data,
    said data synthesis circuit combining the visual data containing the inserted digital watermark and the audio data previously separated by said data separation circuit.

4. A digital watermarking device as set forth in claim 2, further comprising a time stamp detection circuit for detecting and extracting the time stamp information from the visual data in said digital information.

5. A digital watermarking device as set forth in claim 1, further comprising:
    a data separation circuit which separates the digital information into visual data and audio data;
    a time stamp detection circuit which detects and extracts time stamps from said visual data, said time stamps being said predefined data used for determining which of said plurality of information types is selected for inclusion in said digital watermark to be inserted into said visual data by said digital watermark insertion circuit at said location of said time stamps; and
    a data synthesis circuit which combines the visual data containing the inserted digital watermark and the audio data separated by the data separation circuit.

6. A digital watermarking device to detect digital watermarks from digital information, said digital watermarking device comprising:
    a digital watermark detection circuit for detecting said digital watermarks contained within said digital information, said digital watermarks being positioned at locations within said digital information corresponding to locations of predefined data said watermarks containing information selected from a plurality of information types.

7. A digital watermarking device as set forth in claim 6, wherein said digital watermark detection circuit detects the digital watermark, said predefined data corresponds to time stamps extracted from visual data in the digital information.

8. A digital watermarking device as set forth in claim 7, further comprising:
    a data separation circuit for separating said digital information into visual data and audio data, said digital watermark detection circuit detects the digital watermark contained within said visual data separated by said data separation circuit;
    a display signal generation circuit for preparing said display signal by synthesizing the visual data with the digital watermark detected by said digital watermark detection circuit; and
    an audio data conversion circuit for converting audio data separated by said data separation circuit into an analog signal.

9. A digital watermarking device as set forth in claim 7, further comprising a time stamp detection circuit for detecting and extracting time stamps from the visual data in said digital information.

10. A digital watermarking device as set forth in claim 6, further comprising
    a data separation circuit for separating the digital information into visual data and audio data;
    a time stamp detection circuit for detecting and extracting time stamps from the visual data in said digital information, said digital watermark detection circuit detects the digital watermark within the visual data separated by said data separation circuit and corresponding to locations of the time stamps within said digital information;
    a display signal generation circuit for preparing a display signal by synthesizing the visual data with the digital watermark detected by said digital watermark detection circuit; and
    an audio data conversion circuit for converting the audio data separated by said data separation circuit into an analog signal.

11. A digital watermarking device for inserting digital watermark into digital information comprising:
    a digital watermark insertion circuit for inserting said digital watermark into said digital information, insertion location of said digital watermark uniquely corresponding to a location of predefined data held by said digital information; and
    a digital watermark detection circuit which detects the digital watermark within the digital information.

12. A digital watermarking device as set forth in claim 11, wherein said digital watermark insertion circuit inserts the digital watermark of an information type selected based on time stamps extracted from said visual data, said time stamps being said predefined data;
    and said digital watermark detection circuit detects the digital watermark inserted in visual data at a location corresponding to a location of said time stamps information contained in said digital watermark being selected from a plurality of information types based on position of the time stamps within said digital information.

13. A digital watermarking device as set forth in claim 11, further comprising
a data separation circuit for separating the digital information into visual data and audio data;
a time stamp detection circuit for detecting and extracting time stamps from said visual data, said digital watermark insertion circuit inserts said digital watermark into said visual data, insertion location of said digital watermark uniquely corresponding to a location of the time stamps within said digital information;
a display signal generation circuit for preparing a display signal by synthesizing the visual data with the digital watermark detected by said digital watermark detection circuit; and
an audio data conversion circuit for converting the audio data separated by said data separation circuit into an analog signal,
said digital watermark detection circuit detects said digital watermark within the visual data separated by said data separation circuit corresponding to the location of the time stamps.

14. A digital watermark insertion method for inserting digital watermark into digital information, the method comprising:
inserting the digital watermark into the digital information, insertion location of the digital watermark uniquely corresponding to a location of predefined data held by the digital information.

15. A digital watermark insertion method as set forth in claim 14, further comprising:
extracting time stamps contained in visual data in the digital information prior to inserting said digital watermark into the digital information, the predefined data corresponds to the time stamp information.

16. A digital watermark detection method for detecting the digital watermark from the digital information, said method comprising:
detecting the digital watermarks within the digital information, said digital watermark watermarks being positioned at locations within said digital information corresponding to locations of predefined data, said watermarks containing information selected from a plurality of information types.

17. A digital information detection method as set forth in claim 16, wherein, when the digital watermark is detected, said digital information detection method further comprises:
extracting the time stamps contained in visual data in the digital information; and
detecting the digital watermark within the visual data at locations corresponding to the time stamps.

18. A computer readable medium for storing a digital watermark insertion program, said program executes the digital watermark insertion process for inserting the digital watermark into the digital information by controlling the computer, the digital watermark being uniquely selected from a plurality of information types, said information types being selected based on a predefined data contained in the digital information at an insertion location of each watermark.

19. A computer readable medium as set forth in claim 18, wherein said digital watermark insertion program extracts time stamps corresponding to visual data in the digital information prior to inserting the digital watermark into the digital information, and inserts the digital watermark into the visual data at said insertion locations corresponding to locations of the time stamps, said time stamps being said predefined data.

20. A computer readable medium for storing a digital watermark detection program for detecting digital watermark contained in digital information, said digital watermark detection program comprises the function of:
executing a detection process for detecting the digital watermark in the digital information, said digital watermark being uniquely selected from a plurality of information types, said information types being selected based on a predefined data contained in the digital information at an insertion location of each watermark.

21. A computer readable medium as set forth in claim 20, wherein, when the digital watermark is detected in the digital information, said digital watermark detection program extracts time stamps corresponding to visual data in the digital information, said insertion location of said digital watermark uniquely corresponding to locations of the time stamps.

22. A digital watermarking device comprising:
a digital watermark insertion means for inserting digital watermark into digital information, the digital watermark being uniquely selected from a plurality of information types, said information types being selected based on a predefined data contained in said digital information at an insertion location of each watermark.

23. A digital watermarking device as set forth in claim 22, wherein said digital watermark insertion means inserts the digital watermark into visual data contained in the digital information, said insertion location of said digital watermark uniquely corresponding to locations of time stamps extracted from the visual data.

24. A digital watermarking device as set forth in claim 23, further comprising:
a data separation means for separating the digital information into visual data and audio data, and
a data synthesis means for synthesizing the visual data and the audio data,
wherein said digital watermark insertion means inserts the digital watermark into the visual data, and said data synthesis means synthesizes the visual data containing the inserted digital watermark and the audio data.

25. A digital watermarking device as set forth in claim 23, further comprising a time stamp detection means for detecting and extracting the time stamps from the visual data in said digital information.

26. A digital watermarking device as set forth in claim 22, further comprising:
a data separation means for separating the digital information into visual data and audio data;
a time stamp detection means for detecting and extracting time stamps from said visual data; and
a data synthesis means for synthesizing the visual data and the audio data;
wherein said digital watermark insertion means inserts the digital watermark, containing information of a type uniquely determined by the time stamps, into the visual data, and said data synthesis means synthesizes the visual data containing the inserted digital watermark and the audio data.

27. A digital watermarking device to detect digital watermarks contained in digital information, said device comprising:
a digital watermark detection means for detecting the digital watermarks, said digital watermarks being positioned at locations within said digital information corresponding to locations of predefined data, said watermarks containing information selected from a plurality of information types.

28. A digital watermarking device as set forth in claim 27, wherein said predefined data corresponds to time stamps extracted from visual data contained in the digital information.

29. A digital watermarking device as set forth in claim 28, further comprising
- a data separation means for separating the digital information into the visual data and the audio data, said digital watermark detection means detects the digital watermark from the visual data separated by said data separation means;
- a display signal generation means for preparing the display signal by synthesizing the visual data with the digital watermark detected by said digital watermark detection means; and
- an audio data conversion means for converting the audio data separated by said data separation means into the analog signal.

30. A digital watermarking device as set forth in claim 28, further comprising a time stamp detection means for detecting and extracting time stamps from the visual data in said digital information.

31. A digital watermarking device as set forth in claim 27, further comprising
- a data separation means for separating the digital information into the visual data and the audio data;
- a time stamp detection means for detecting and extracting the time stamps from the visual data in said digital information;
- a display signal generation means for preparing the display signal by synthesizing the visual data with the digital watermark detected by said digital watermark detection means; and
- an audio data conversion means for converting the audio data separated by said data separation means into the analog signal,
- wherein said digital watermark detection means detects the digital watermark uniquely corresponding to a location of the time stamps from the visual data.

32. A digital watermarking device for inserting digital watermark into digital information comprising:
- a digital watermark insertion means for inserting the digital watermark into the digital information, insertion location of said digital watermark uniquely corresponding to a location of predefined data contained in said digital information; and
- a digital watermark detection means for detecting the digital watermark in the digital information.

33. A digital watermarking device as set forth in claim 32, wherein said predefined data uniquely corresponds to time stamp information extracted from visual data contained in the digital information, said digital watermark being inserted into the visual data at said insertion location corresponding to a location of the time stamp information by said digital watermark insertion means; and
- said digital watermark detection means detects the digital watermark in the visual data corresponding to the time stamp information.

34. A digital watermarking device as set forth in claim 32, further comprising
- a data separation means for separating the digital information into visual data and audio data;
- a time stamp detection means for detecting and extracting time stamp information from said visual data, insertion location of said digital watermark uniquely corresponding to a location of said time stamp information within said digital information;
- a data synthesis means for synthesizing the visual data and the audio data, said visual data containing digital watermark inserted by said digital watermark insertion means;
- a display signal generation means for preparing the display signal by synthesizing the visual data with the digital watermark; and
- an audio data conversion means for converting the audio data into an analog signal.

* * * * *